Sept. 8, 1953  I. P. DE LA LLANA  2,651,378
HIGH-CLEARANCE CRAWLER TRACTOR
Filed Aug. 3, 1950  4 Sheets-Sheet 1

Inventor:
ISAAC PÉREZ DE LA LLANA
By: [signature]
Attorney.

Sept. 8, 1953

I. P. DE LA LLANA 2,651,378

HIGH-CLEARANCE CRAWLER TRACTOR

Filed Aug. 3, 1950

Inventor:
ISAAC PÉREZ DE LA LLANA

By: Paul O. Pippel
Attorney.

Sept. 8, 1953
I. P. DE LA LLANA
2,651,378
HIGH-CLEARANCE CRAWLER TRACTOR
Filed Aug. 3, 1950
4 Sheets-Sheet 4
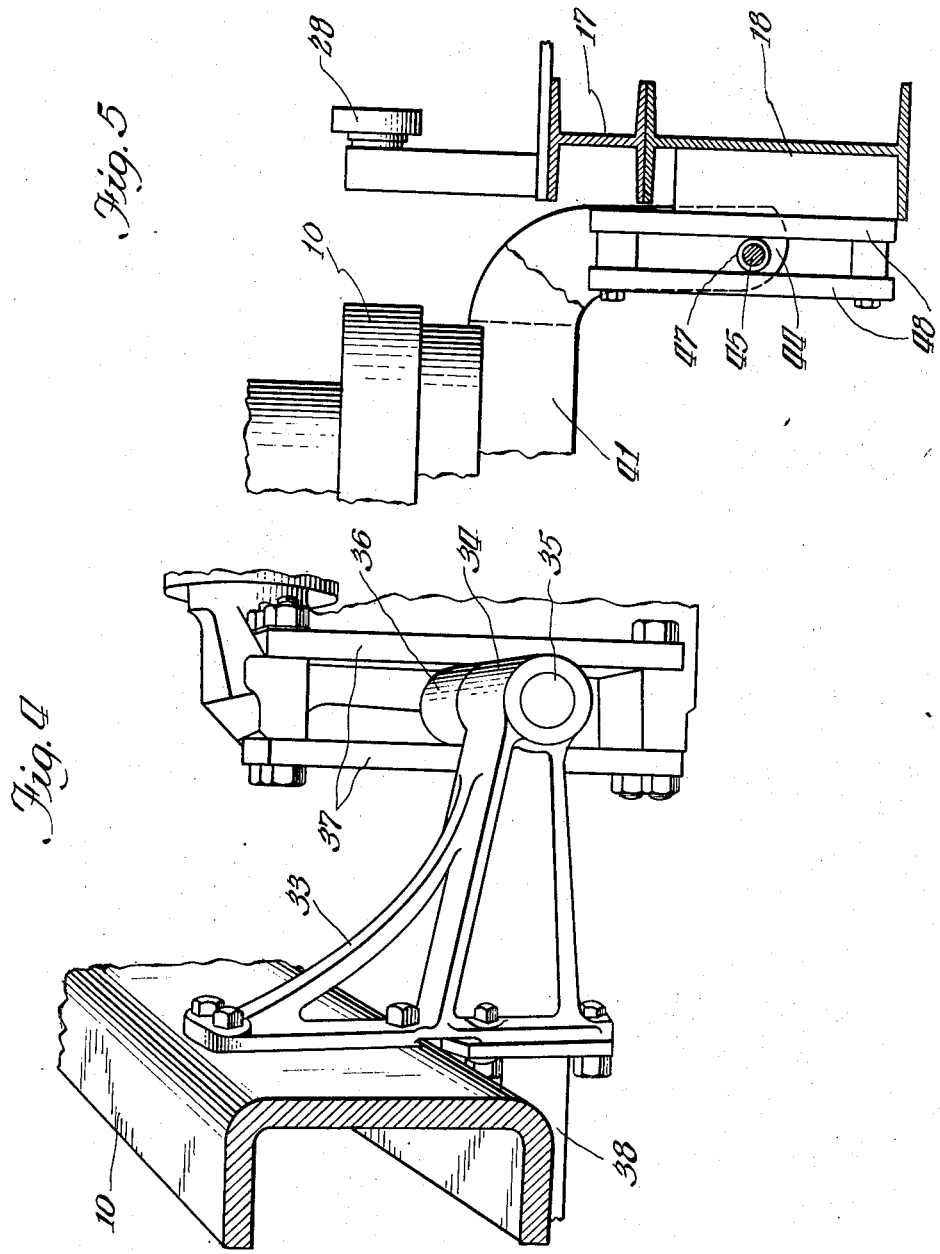
Inventor:
ISAAC PÉREZ DE LA LLANA
By: Paul O. Pippel
Attorney.

Patented Sept. 8, 1953

2,651,378

UNITED STATES PATENT OFFICE 2,651,378

HIGH-CLEARANCE CRAWLER TRACTOR

Isaac Pérez de la Llana, Santurce, Puerto Rico, assignor to San Miguel & Compania, Inc., a corporation of Puerto Rico Application August 3, 1950, Serial No. 177,469

9 Claims. (Cl. 180—9.1)

This invention relates to a high-clearance crawler tractor. Standard crawler tractors now in use do not have adequate clearance to permit their use in certain row-crop operations. For example, in the raising of sugar cane the stalks when mature are harvested by severing them at or near the ground line so that the root structure of the plant is not disturbed and in due course of time this root structure sprouts and grows another crop of stalks. This cutting and re-growing without planting may run over a long period of years; sometimes the crop is not re-planted for as long a period as ten or even fifteen years. It follows that cultivating and analogous tillage operations must be performed between the rows so as not to injure the crop. Crawler tractors are commonly employed as the motive power for hauling can tillage tools in the cane fields, and, as previously stated, standardized crawler tractors now in use have their bodies too low to provide adequate clearance for straddling a re-growing crop of sugar cane after it has been harvested.

An example of altering the structure of a standard crawler tractor to adapt it for high-clearance agricultural use is shown in Starr Patent 2,076,009 wherein the main power plant or main frame of the tractor is carried on a pair of laterally spaced crawler tracks through the use of dropped gear rear housings forming load-supporting connections for the rear end of the tractor, and by blocking up the front end of the tractor at the points where the cross equalizer bar carries the forward part of the main tractor body on the crawler tracks. In this fashion a suitable high-clearance crawler tractor can be provided. An objection to the construction shown in said Starr patent is that special gear-reduction housings and reduction gearing must be provided and this for practical purposes involves original fabrication and assembly of the tractor at the factory. Such special adaptations involving engineering design and factory building might be objectionable from a cost standpoint unless large volume assembly line fabrication is economically justified.

There are times when it is desirable to be able to reconstruct a standard crawler tractor to high-clearance construction without involving special costly designs or without having to stock extra parts not standard and readily available. In other words, it is desirable that a local distributor, for example, of the standard tractor be able to provide for a customer who may desire a high-clearance crawler tractor that can easily be created with standard parts on hand and with ordinary shop facilities.

In the Starr patent above referred to the parts providing additional elevation for high clearance are arranged between the top side of the track frames of the crawler track units and the main body of the tractor. In the present disclosure it is intended to provide the elevating parts to achieve high clearance from the under side of the side track frames of the crawler track units so as not to interfere with the load-supporting connections which mount the main body of the tractor on the oppositely disposed track frames of the crawler track units.

The primary object of this invention is to provide an improved and simplified high-clearance crawler tractor.

Another object is to provide adaptor means including parts readily available in distributors' repair shops for altering a standard crawler tractor to one having desirable high-clearance construction and characteristics.

Another important object is to provide such high clearance construction which will not require elaborate factory designing and production facilities, and which will enable a person readily to re-build and adapt a standard crawler tractor to one of high-clearance construction with ease and facility.

Another important object of this invention is to provide a high-clearance crawler tractor which will have proper weight distribution and be stable in operation even when performing under unusually arduous conditions, and one in which the crawler track units in their up-and-down movement will be properly stabilized and controlled so that maneuverability and operation of a high-clearance tractor will be all that could be desired.

Other important objects will become apparent to those skilled in this art as this disclosure unfolds.

A standard crawler tractor of a type readily adaptable to reconstruction for high-clearance purposes is disclosed in Patent No. 2,135,619 to Johnston dated November 8, 1938, and reference should be made to this patent for a better understanding of the present disclosure.

An illustrative example of the present invention is disclosed in the accompanying sheets of drawings wherein:

Figure 4 is a perspective detail view of one of the stabilizing control connections; and Figure 5 is a detail front elevational view partly in section to illustrate another of the stabilizing control connections between the tractor body and a side track frame.

As disclosed in the illustrative example of the drawings, the desirable objects of the invention are generally achieved in a standard crawler tractor having a main power plant body or frame at each side of which is disposed a longitudinally extending track frame, each enveloped by an endless track belt, the track frame including weight-transmitting track rollers riding on the ground runs of the respective tracks. The main power plant frame or body is carried on the respective track frames at two load-transmitting points at the rear, and through the use of a cross equalizer at a single load-transmitting point at the front. In the usual way the main frame rides level and the track frames may oscillate up and down in running over uneven terrain. To achieve the high clearance characteristic desired, the track frames are appreciably heightened by adding an extension portion or otherwise increasing the height of the track frames in a downward direction so as not to interfere with the super-structure mounting of the main body or frame on the top side of the track frames. Thus, the track frames in effect have a vertical spacer portion the lower edge of which carries the track rollers. In this fashion the tractor is materially heightened to give ground clearance. Still further, the track frame, including the spacer portion thereof, is extended ahead and stabilizing control connections are provided between the main frame and the track frames. In view of the forward extension of the track frames, added track rollers are provided in a novel manner and the forward end of the main frame or body is weighted so that the high clearance adaptation of the standard tractor will maneuver and function satisfactorily.

Figure 1:
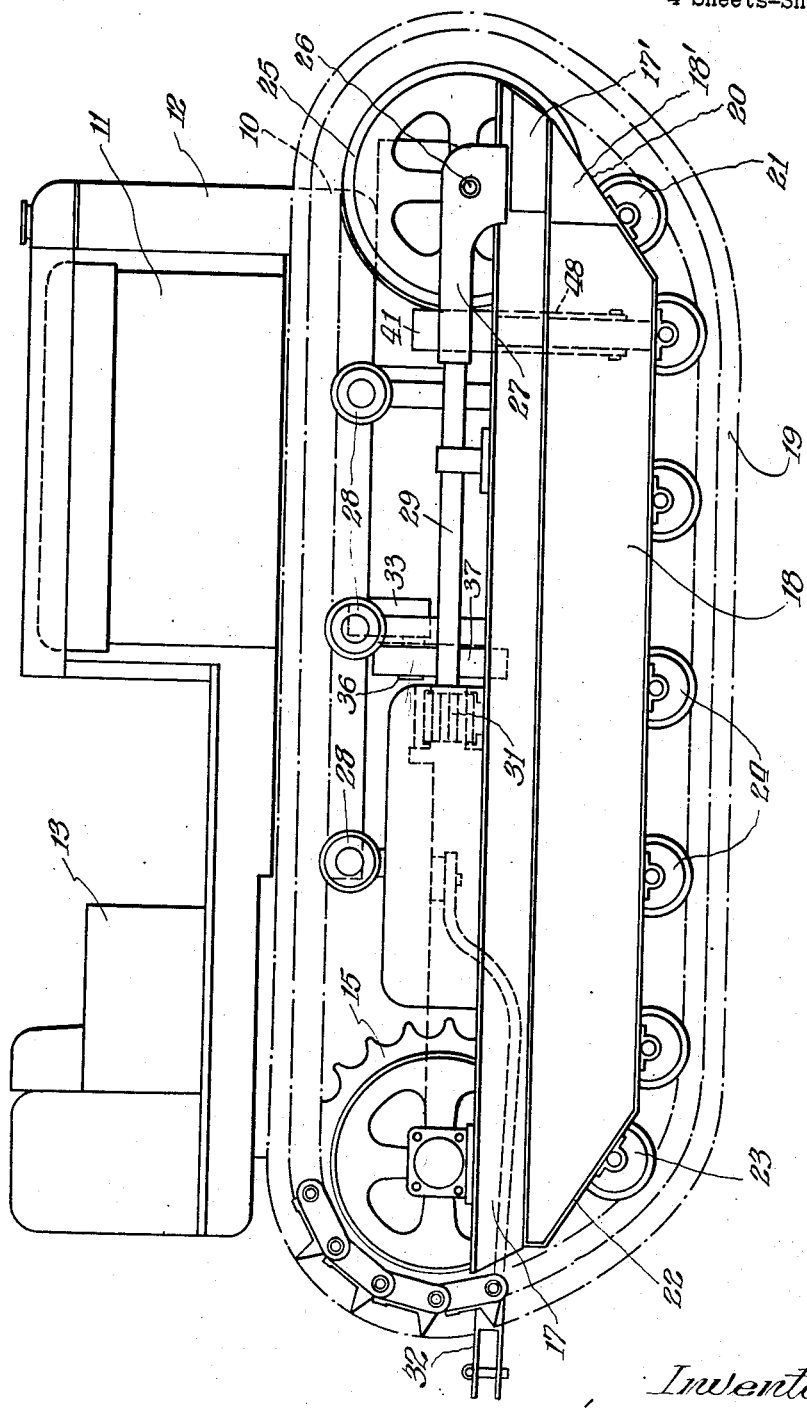
Figure 1 is a general side elevational view of the improved tractor.

Looking now to the drawings for a more detailed description, it will be seen that the tractor has a longitudinally extending main frame or body 10 including side channel construction, as shown in Figure 4. The frame at its front end carries a motor or power plant 11 at the front of which is disposed the radiator 12 and at the rear of the frame is located the driver's seat 13. At its rear end the main frame carries a transverse dead axle shaft 14 near the opposite ends of which are the usual track-driving sprocket wheels 15 driven in the usual manner from the engine by means of gearing, not shown, contained within the main frame or power plant body 10 in a manner well understood in this art. Opposite ends of the axle shaft 14, as shown in said Johnston Patent 2,135,619, are provided with pivot mountings 16 in the form of ball joints connected to and resting on the top side of the rear ends of the usual track frames 17. These track frames 17 are in the form of a channel member and usually carry track rollers in the standard crawler tractor construction. However, in the present modification the track frame 17 is provided with an extension or spacer portion 18 which may also be in the form of a channel that is weldingly or otherwise connected to the bottom edge of the track frame channel 17. By this means the vertical height of the track frame with the spacer extension portion 18 is materially increased. The track rollers shown at 24 instead of being carried by the lower edge of the track frame channel 17 are now carried by the lower edge of the extension or spacer track frame portion 18, said track rollers operating on the ground run of the usual endless track or belt 19 which is engaged by the track drive sprocket wheels 15 on each side of the tractor. The track belt 19 is composed of the usual articulated track links as shown in Figure 1.

Figure 2:
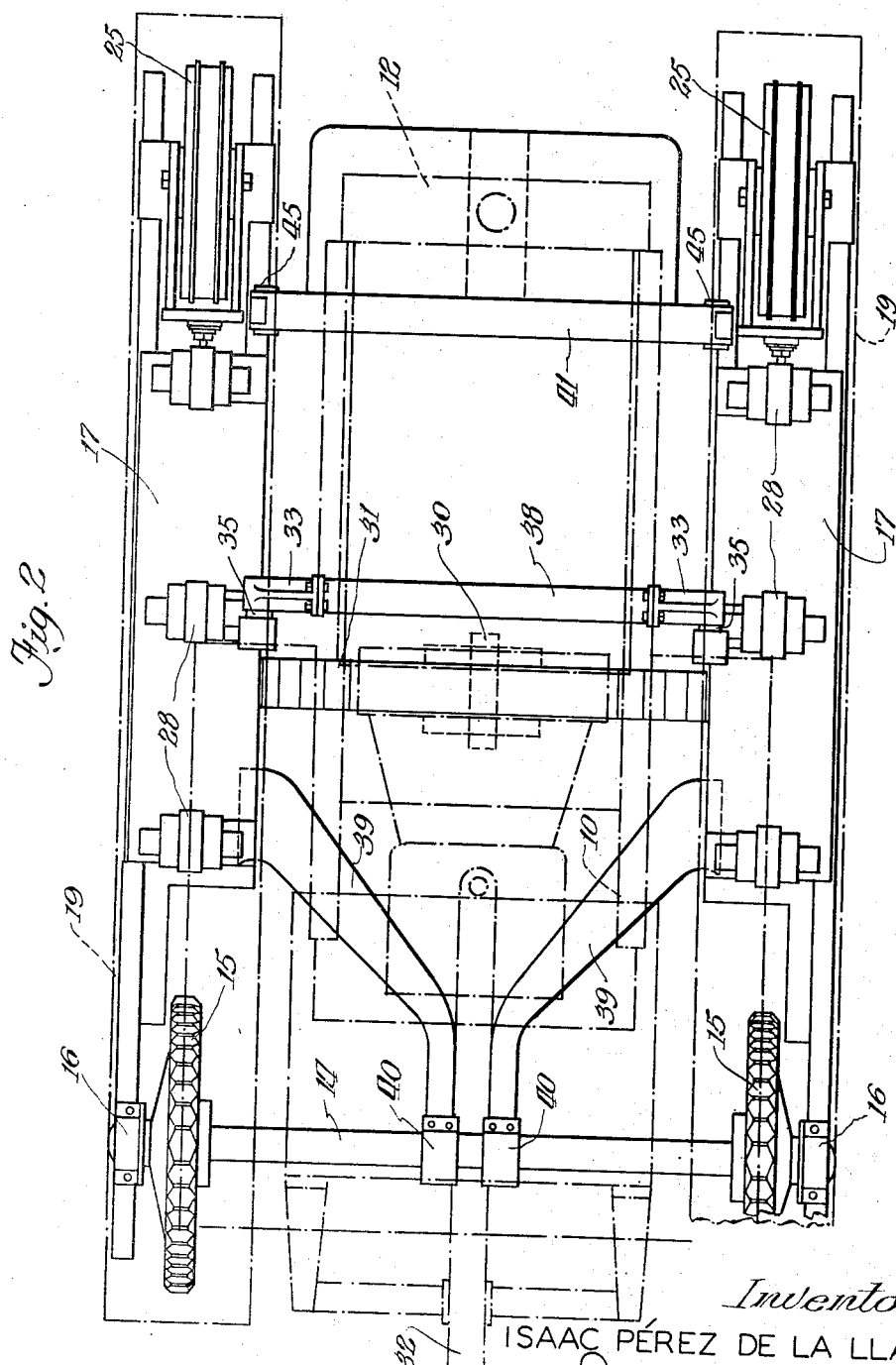
Figure 2 is a plan view.

The track frame 17 at each side is extended forwardly to a point well in advance of the front end of the engine 11 and its radiator 12 on the main frame, and it is desirable that this front extended portion be made thick and heavy as by means of a plate 17' so as to add weight. Similarly, the spacer or vertically extended portion 18 is extended ahead as at 18' and similarly weighted. The lower edge of the portion 18' is cut off at an angle as shown at 20 and a track roller 21 is carried by this cut-off angle portion 20. Similarly, the rear end of the extension spacer portion 18 of the track frame is upwardly inclined or cut off at an angle as shown at 22 and said latter angle cut-off portion is provided with a track roller 23. From this it will be seen that the axes of the track rollers 21 and 23 on the cut-off angle portions are disposed above the axes of the ground run track rollers 24. As shown in Figure 1, the front extension portion 17' of the track frame 17 on each side of the tractor carries a front idler wheel 25 turning on shafts 26 carried in brackets 27 on the top side of the track frame 17. The track frame extensions 17'—18' extend ahead of the axes of the track rollers 25 and likewise forwardly or ahead of the front end of the body 10. This forward extension of the track frame 17 and spacer portion 18 thereof makes it possible to use the extra track rollers 21 and 23 which is desirable in lending stability to the crawler tractor since it now has had its height very materially increased for ground clearance purposes. The endless tracks 19 envelop each track frame 17 and the drive sprockets 15 and idlers 25. The tracks will have their length increased by insertion of the necessary number of track links and tread plates or pads of standard type from stock on hand to accommodate the added spacer portions 18. The track frames also carry guide rollers 28 to support the upper run of the track 19 and the front idlers 25 are held in the desired extended position by the usual track recoil mechanism 29 in a manner common to this art. The forward weight portion of the main power plant frame or body is carried centrally on a load-supporting pivot connection 30 about a longitudinal axis, as shown in Figure 2, incorporated with a transverse equalizer spring 31 of the usual construction. The load-supporting points 16 and 30 thus provide the usual 3-point mounting for the main frame of the tractor on the said crawler track frames. Since the spacer or extension portion 18 is provided below the normal track frame 17 in the form herein illustrated as an attachment, it will be seen that the superstructure mounting of the main frame on the track frame as in the normal or standard crawler tractor is in no wise interfered with, and this is a highly desirable feature as can readily be understood because the idlers 25, brackets 27, recoil means 29, equalizer 31, and bearing 16 all remain on the frames 17 as they do in the regular or standard tractor construction.

A drawbar 32 is provided in the usual manner from beneath the body 10 of the tractor. As the crawler tractor operates over uneven ground the track frames 17 rise and fall about the ball pivot joints 16, and since there is a tendency, especially during steering, for the track frames to toe in or spread out, a stabilizing means is provided, as taught in the Johnston Patent 2,135,619, heretofore mentioned, to control the up-and-down oscillating movements of the track frames 17. Accordingly, as shown in Figures 2 and 4, immediately ahead of the equalizer 31 the body frame 10 carries a laterally extending bracket 33 at each side extending to a point adjacent the inner face of the adjacent track frame 17, there being one such bracket 33 at each side of the main frame or body. The outer end of each bracket 33 is formed into a bearing 34 carrying a longitudinal pin 35 in turn carrying a roller 36. At each side of the tractor these rollers 36 are located between spaced upright pieces 37, which form a vertical guide slot, the pieces 37 being carried by the track frames 17 as in the standard construction, the rollers 36 serving to constrain the track frames 17 for up-and-down movement only. These oppositely disposed brackets 33 are cross-braced by a transverse bar 38. As in the Johnston patent heretofore mentioned, torque strain caused by the oscillating movement of each track frame 17 is further controlled by diagonal brace members 39, as shown in Figure 2, connected as solidly as possible to the inner faces of the track frame elements 17 at their forward portions and at their rear portions by means of pivot bearings 40 near the center of and on the dead axle shaft 14.

Figure 3:
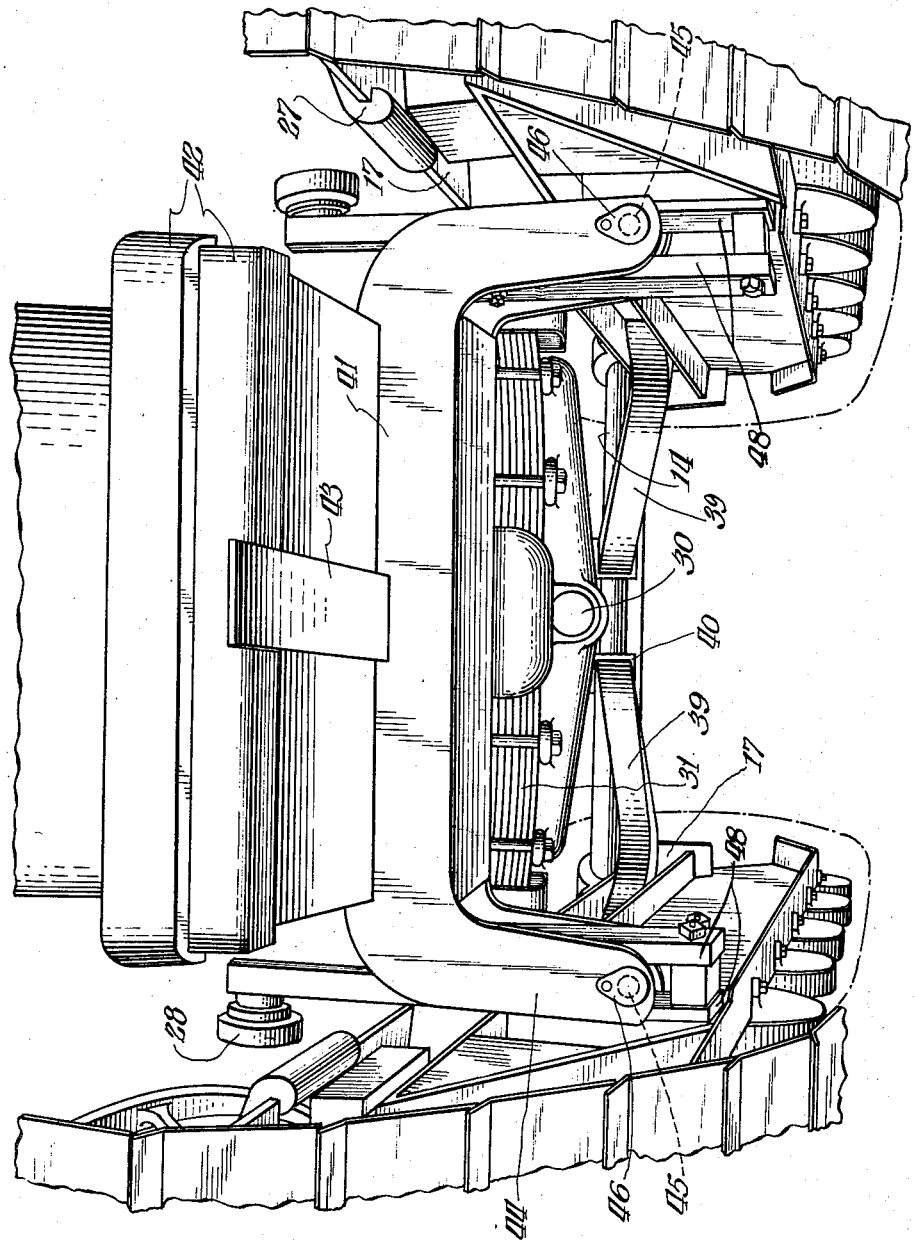
Figure 3 is a front perspective view of the tractor.

With the tractor converted to high clearance by the addition of the spacer track frame portions 18 and the forward extensions 17' and 18', a serious problem results in providing stabilized control for the extended track-frame elements, and accordingly, as shown in Figures 2 and 3, a heavy cross bolster 41 is transversely disposed and solidly connected to the under side of the front end of the main frame body 10, and the entire front end of the body at this point is built up with heavy metal pieces 42 to provide weight and strength at the forward end of the body. The cross bolster 41 is also weldingly cross-tied to the weight-adding portions 42 by a heavy bar 43, as shown in Figure 3, and the opposite ends of the cross bolster 41 are downwardly arched or extended as bifurcations 44. See also Figure 5 where the terminal ends of the respective bifurcations carry longitudinally disposed pins 45 protected by dust cover plates 46. On each pin 45 is a roller 47 carried for up-and-down rolling movement between spaced pieces 48 providing an upright slot or track guide as shown best in Figure 5. The upright slotted bracket structure 48 is solidly connected as shown in Figure 5 to the spacer extension 18 of the track frame structure at a point, as best shown in Figure 1, well forward of the equalizer bar 31 and its adjacent stabilizer control rollers 36. Thus, the stabilizing control is not only provided as in the standard tractor for the track frame 17 but also a track frame control stabilizer is provided for the spacer track frame extension 18, and the latter has a more considerable vertical amplitude of permitted motion because it is more distant from the pivot point 16 which requires a greater arc of movement.

From this disclosure, it can now be seen that in a simple way, remote from the factory, and by using ordinary shop practices and standard parts on hand, a standard crawler tractor may be readily converted into one having high-clearance characteristics. The spacer frame extension 18 may be a standard channel construction, readily available, and the additional track rollers 21 and 23 are standard parts out of the distributor's stock bin. The forward extension 17' and 18' are merely welded on metal, and the same is true of the weight-adding parts 42 and 43 at the front end to help hold down the front end of the crawler track when the drawbar 32 is pulling heavy loads. For this same reason the cross bolster 41 is made very heavy and sturdy. The stabilizer control connections resulting from the use of bolster 41 and the adjacent slot guides 48 further constitute simple welded arrangements requiring no unusual effort for a mechanic.

All in all it must now be appreciated that in a simple manner a standard crawler tractor of the type shown in the Starr and Johnston patents, heretofore referred to, can by the disclosure of this invention be simply converted and adapted for high clearance purposes without in any way sacrificing balance and maneuverability.

It is the intention to cover herein all such changes and modifications from the selected example here disclosed which do not depart from the spirit and scope of the invention as it is defined in the appended claims.

What is claimed is:

1. In a crawler tractor having a power plant body and a pair of spaced crawler track units including respective track frames enveloped by endless tracks made up of track links and pads, said body having its rear end carried on pivot load support connections at opposite sides on the rear ends of the respective track frames so that the track frames may pivot up and down from their rear ends at the sides of the body, a weight transmitting connection supporting the forward part of the body on the top surface of the track frames, a stabilizing connection between each track frame and the body; means to elevate the body of the tractor to give high clearance for travel over row crops comprising a track frame section additive to said track frames and secured as a continuous member to and coextensive in length with the under side of each track frame and each said additive section carrying at its lower edge a series of track rollers riding on the ground runs of the respective endless tracks, said tracks adapted to be lengthened by insertion of additional links and pads to accommodate the added track frame sections.

2. The structure claimed in claim 1 further characterized in that additive stabilizer connections are connected between the forward end of the power plant body and each additive track frame section, said additive stabilizer connections being constructed and arranged to accommodate the high clearance provided by said additive frame section.

3. In a crawler tractor having a power plant body and an endless track at each side thereof made up of track links and pads and including a track frame having pivotal movement, load supporting connections to carry said body directly on the top side of said track frames, a roller and slide stabilizing connection between each track frame and the body; a track frame portion secured to and extending under each track frame to raise the body substantially for high clearance over row crops, the said frame elevating portions being continuous and coextensive in length with the under side of the track frames and carrying track rollers on their lower edges riding on the ground runs of the tracks, and an added roller and slide connection between each track frame elevating portion and the body arranged forwardly of the first-mentioned stabilizing connections and having greater amplitude of movement than the aforementioned stabilizing connection to accommodate and control up and down swinging motion of the track frames over uneven ground, said endless tracks adapted to be lengthened by insertion of additional links and pads to accommodate the added track frame portions.

4. In a crawler tractor, a longitudinally disposed body, a track frame enveloped by an endless track and disposed alongside each side of the body, hinge means supporting the body at the rear ends of each track frame enabling said track frames to hinge up and down, an equalizer spring disposed transversely under a forward portion of the body and having its ends respectively carried on the track frames, means providing a central point of support for the body on and between the ends of the equalizer spring, a cross bolster rigidly connected to the front end of the body and having opposite ends downturned, a roller carried by each downturned end, and a slide connected to and near the forward ends of the track frames to receive said rollers to control and stabilize oscillating movement of the track frames.

5. In a crawler tractor, a body carrying an engine at its front end, a track frame at each side of the body enveloped in an endless track made up of track links and pads, means carrying the body on the track frames comprising load suppports on the top edges thereof so that the latter may oscillate over uneven ground, each track carried by an idler wheel mounted on the front end of the its track frame on an axis disposed forwardly of the front end of the engine, each track frame including as a part thereof a downwardly extending additive portion secured to the under edge thereof to space the track frame upwardly to elevate the body for high clearance, said spacer portion being continuous and coextensive in length with the lower edge of the track frame and carrying track rollers at its lower edge with the rollers riding on the ground run of the endless tracks, the downwardly extending spacer portion also extending forwardly of the front end of the engine, said tracks adapted to be lengthened by insertion of additional links and pads to accommodate the added track frame portion and means adding weight to the forward end of the body ahead of the engine to compensate for the extension of the track frame forwardly as defined.

6. In a crawler tractor, a body carrying an engine at its front end, a track frame at each side of the body enveloped in an endless track made up of track links and pads, means carrying the body on the track frames on load supports on the top edges of the frames so that the latter may oscillate over uneven ground, each track carried by an idler wheel mounted on the front end of the track frame on an axis disposed forwardly of the front end of the engine, each track frame including as a part thereof a downwardly extending portion to space the track frame upwardly to elevate the body for high clearance, said spacer portion being continuous and coextensive in length with the lower edge of the track frame and carrying track rollers at its lower edge with the rollers riding on the ground run of the endless tracks, the lower edges of said spacer portion at the front and rear ends thereof being inclined upwardly with each inclined end carrying a track roller on an axis above the axes of the aforementioned ground run track rollers to conform to the end loops of the endless tracks and provide roller track contact at said ends, said tracks adapted to be lengthened by insertion of additional links and pads to accommodate the added track frame portion.

7. A crawler tractor having a longitudinal body, a track frame at each side of the body enveloped in an endless track made up of track links and pads, pivot connections on the top side of each rear end of each track frame to support the body and permit the track frames to oscillate vertically, means supporting a forward portion of the body on a forward portion of the tracks, spacer means comprising a continuous member provided at the under edge of each track frame coextensive in length with the under edge of the frames to increase the height of the track frames and provide high clearance for said body without disturbing the load supporting connections of the body on the track frames, a slotted bracket on the inner face of the front end of each track frame, and a cross bolster of arched form having depending portions each end carrying a roller respectively guided in a slotted bracket, said bolster carried by the front end of the body, said tracks adapted to be lengthened by insertion of additional links and pads to accommodate the spacer means.

8. A crawler tractor as set forth in claim 7 in which the track frames extend forwardly ahead of the body, and the forward portion of the body is provided with weighted portions.

9. A standard crawler tractor adapted for alteration to one adapted for high clearance work and having a longitudinal body, a standard track frame member at each side of the body enveloped in an endless track made up of standard track links and pads, pivot connections on the top side of each rear end of each track frame to support the body and allow the track frames to oscillate vertically, means supporting the forward portion of the body on the top side of the forward portion of the track frames, a continuous track frame section having at least the vertical dimension of said standard track frame member secured to and coextensive in length with the under edge of each track frame member and constructed to carry track rollers along its lower edge for rolling contact on the ground run of the endless tracks, said added frame sections appreciably elevating the body for high clearance work without disturbing the load supporting connections of the body on the track frame members, said tracks adapted to be lengthened by insertion of additional standard links and pads to accommodate the added track frame sections, and a stabilizer connection between a forward portion of the body and a forward portion of the heightened track frames.

ISAAC PÉREZ DE LA LLANA.

References Cited in the file of this patent

UNITED STATES PATENTS

| Number | Name | Date |
|---|---|---|
| 1,330,697 | Franklin | Feb. 10, 1920 |
| 1,890,975 | Erdahl | Dec. 13, 1932 |
| 1,963,408 | Huston | June 19, 1934 |
| 2,015,886 | Eberhard | Oct. 1, 1935 |
| 2,076,009 | Starr et al. | Apr. 6, 1937 |
| 2,135,619 | Johnston | Nov. 8, 1938 |
| 2,242,570 | Dafoe | May 20, 1941 |
| 2,374,240 | Shankman | Apr. 24, 1945 |
| 2,596,390 | Essick | May 13, 1952 |

FOREIGN PATENTS

| Number | Country | Date |
|---|---|---|
| 966,961 | France | Oct. 23, 1950 |